June 23, 1970 — E. A. SMITH ET AL — 3,516,215
CORNER BRACKET AND STRUCTURES FABRICATED THEREBY
Filed March 31, 1967 — 3 Sheets-Sheet 1
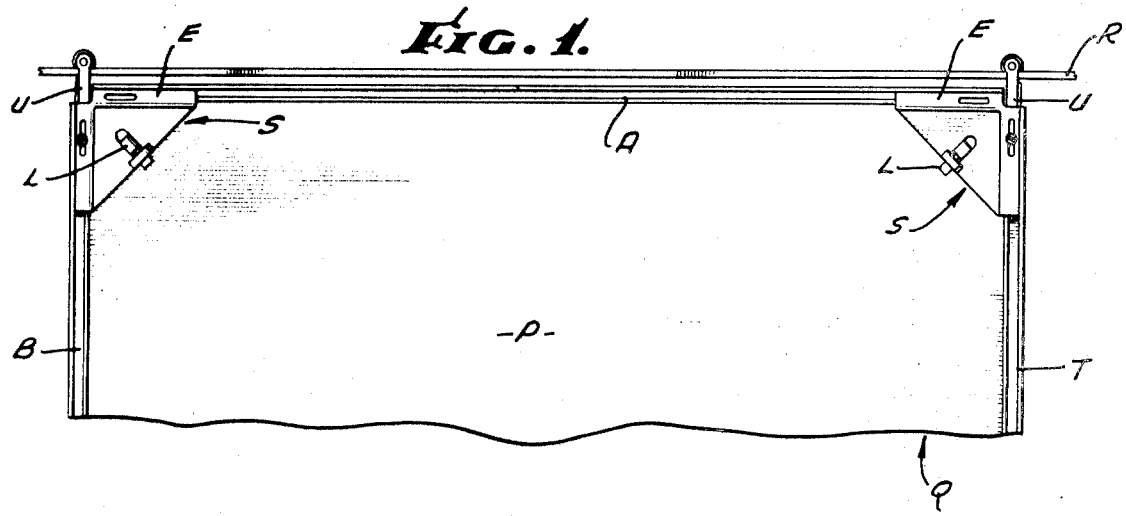
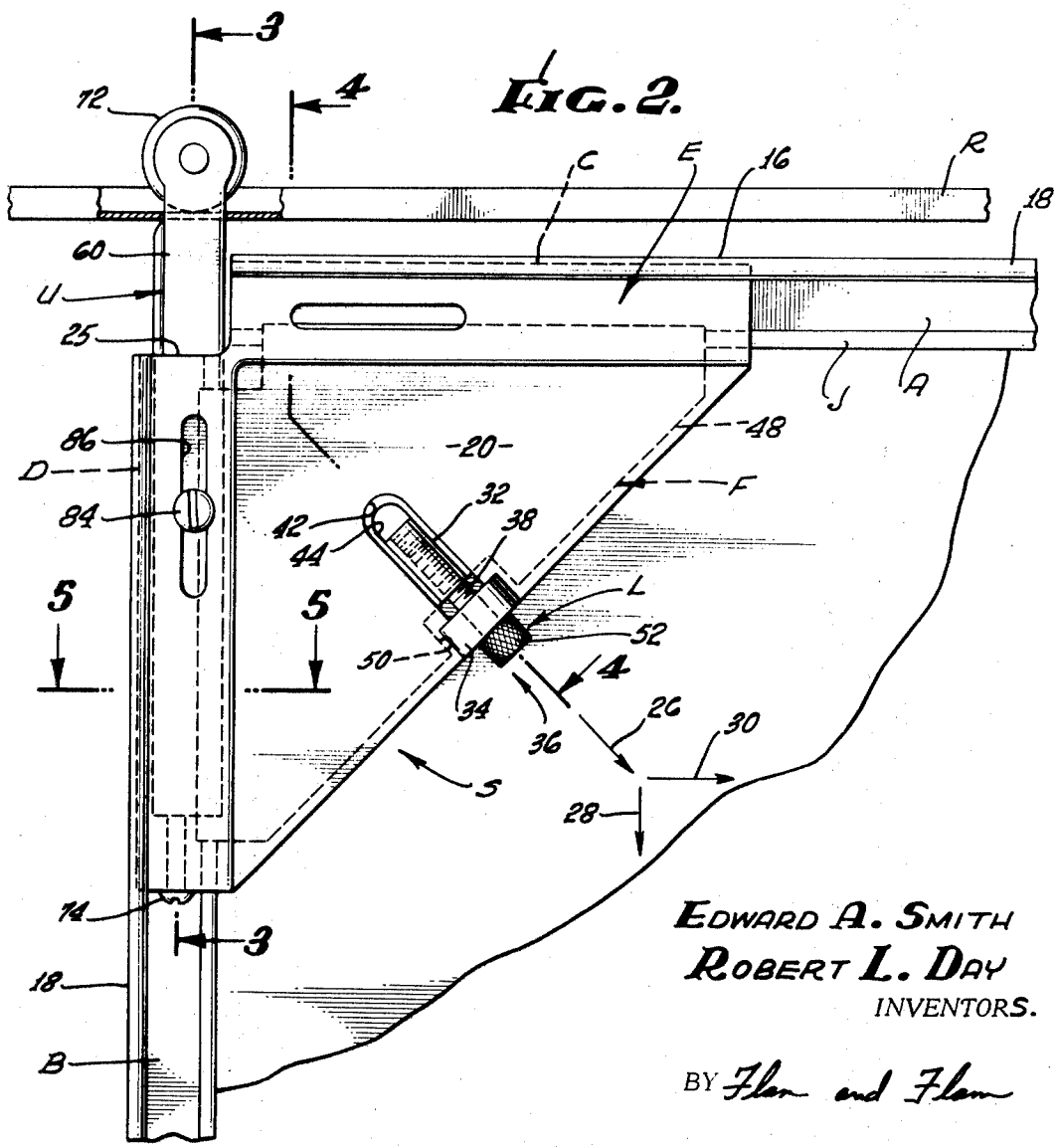
EDWARD A. SMITH
ROBERT L. DAY
INVENTORS.
BY *Flam and Flam*
ATTORNEYS.

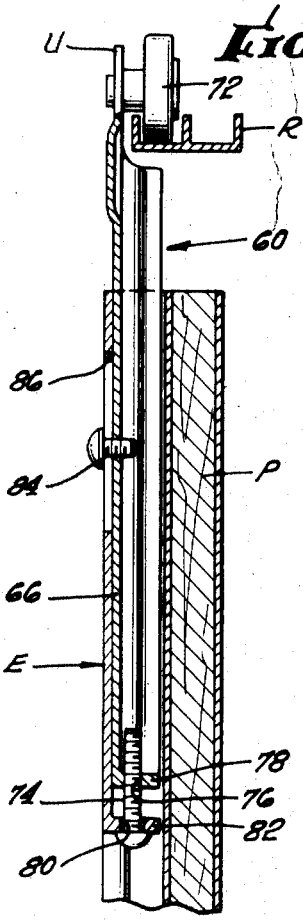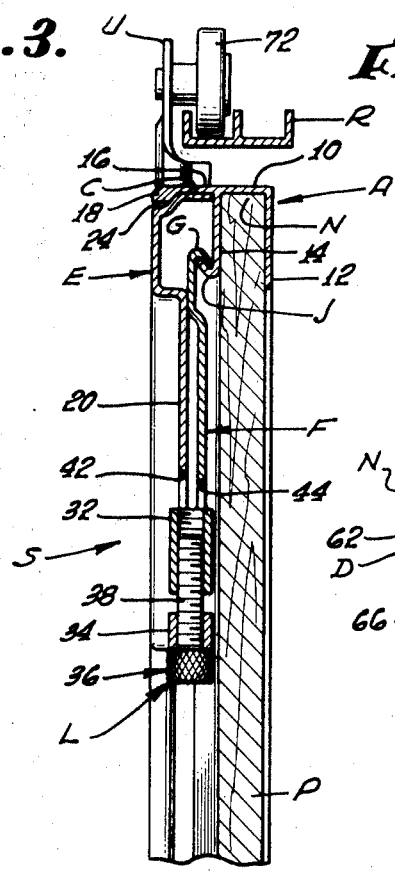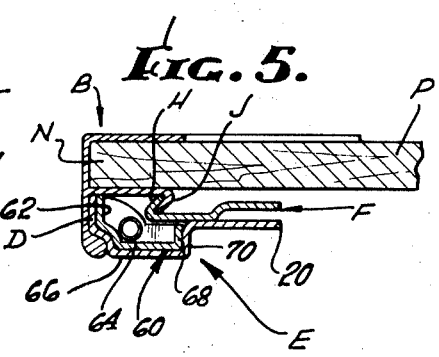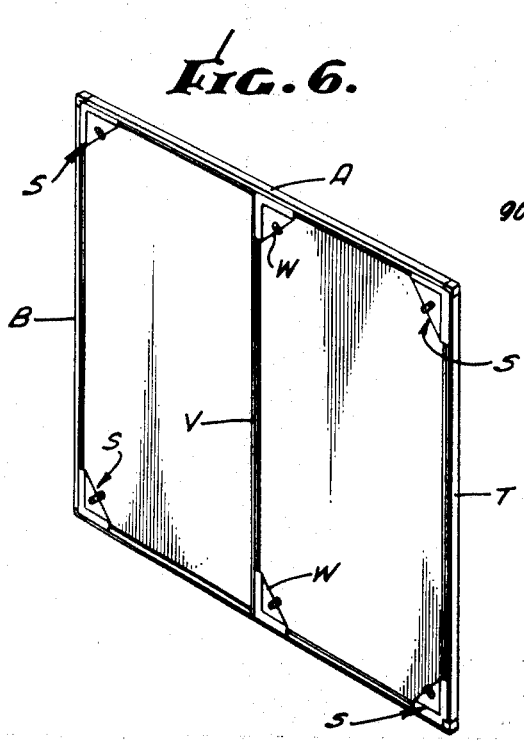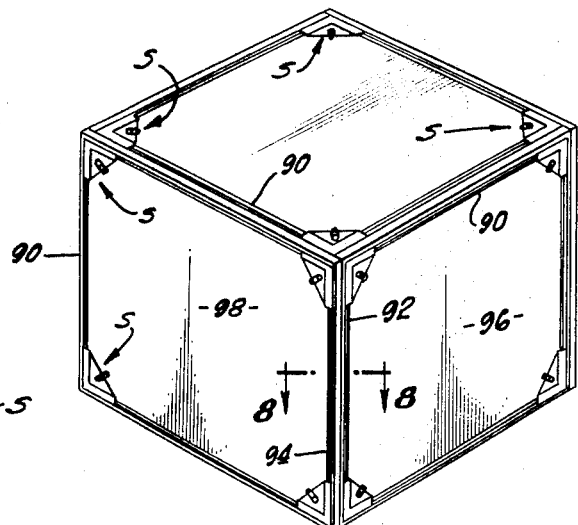

June 23, 1970    E. A. SMITH ET AL    3,516,215
CORNER BRACKET AND STRUCTURES FABRICATED THEREBY
Filed March 31, 1967    3 Sheets-Sheet 3
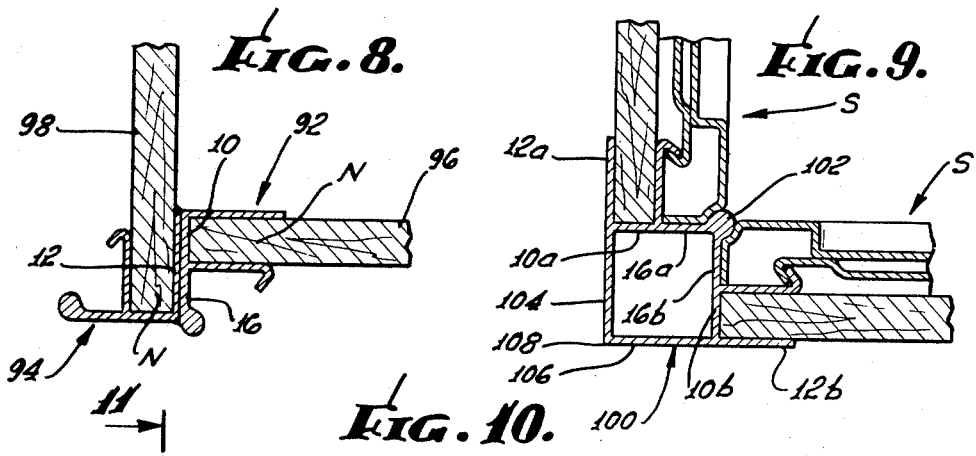
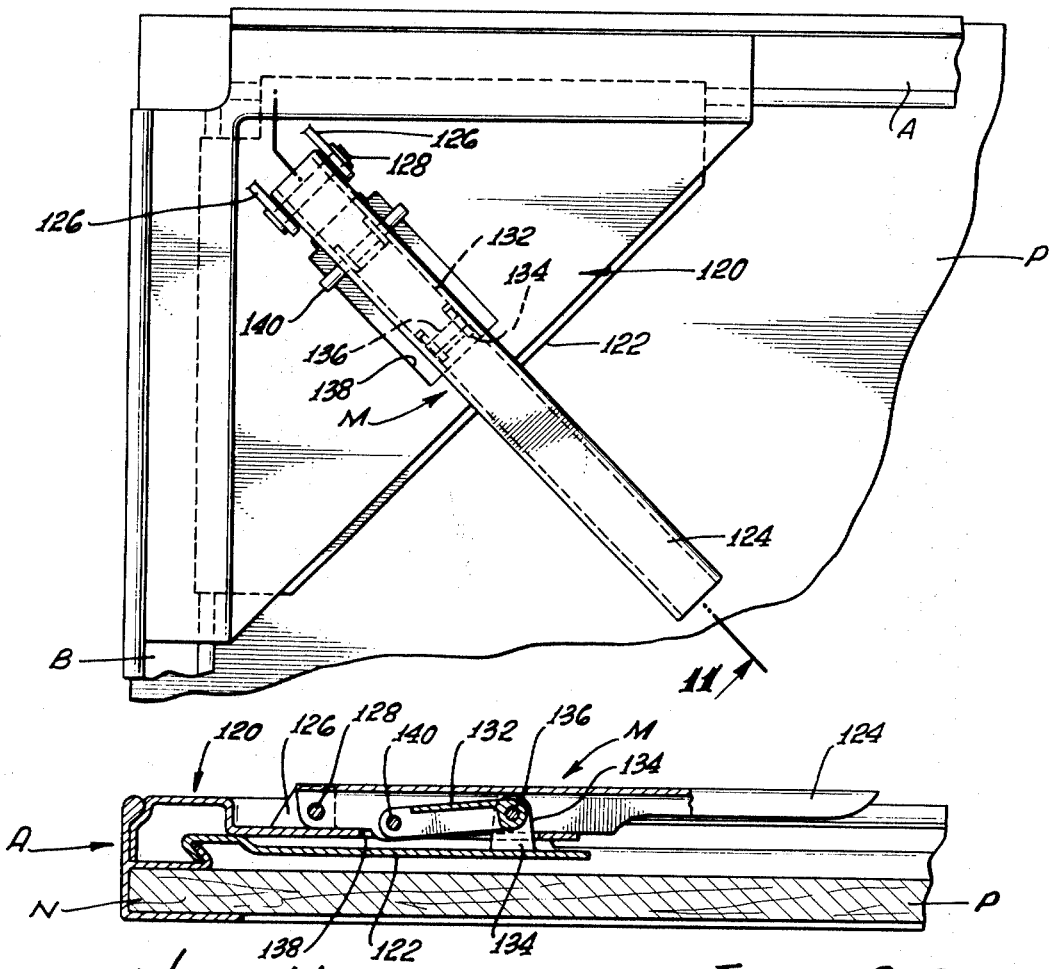
EDWARD A. SMITH
ROBERT L. DAY
INVENTORS.
BY *Flam and Flam*
ATTORNEYS.

United States Patent Office 3,516,215
Patented June 23, 1970

3,516,215
CORNER BRACKET AND STRUCTURES FABRICATED THEREBY
Edward A. Smith, 6641 W. 6th St., Los Angeles, Calif. 90042, and Robert L. Day, 1518 Grismer St., Burbank, Calif. 91504
Filed Mar. 31, 1967, Ser. No. 627,535
Int. Cl. E04c 2/38; F16b 5/06
U.S. Cl. 52—656                                    9 Claims

ABSTRACT OF THE DISCLOSURE

Extruded aluminum frame members A and B (FIGS. 1 and 2) are placed against the sides C and D (see also FIGS. 4 and 5) of a corner bracket plate E. The frame members A and B are held tightly against these surfaces by clamp plate F that underlies the bracket plate E. The clamp plate F has hook flanges G and H interlocking corresponding hook flange J of the frame members. Suitable operating means such as a draw screw assembly L (FIG. 2) or a toggle assembly M (FIGS. 10 and 11) urges the clamp plate F diagonally inwardly of the bracket plate E to produce a rigid corner. Crates, doors, and other structures are thus readily assembled by providing channels N for receiving the edges of plywood panels P.

FIELD OF INVENTION

This invention relates to cabinet, frame and building constructions, and more particularly to a bracket structure for securing edge members rigidly in an angled relationship to each other so that a rigid structural unit results.

SUMMARY OF INVENTION

Manufacture of wardrobe doors, garage doors, and like items often entails custom fabrication at a remote place based on previously taken measurements. Often adjustments must be made, and fitting is required on the job, or the item must be returned to the shop for reworking. This is time consuming, and necessarily expensive, involving the shipment of prefabricated units for installation on the job. It would be highly advantageous if a garage door or a wardrobe door could early and rapidly be made up at the site of the job. One object of this inevntion is to provide corner brackets and edge frame members whereby such result is made possible.

Another object of this invention is to provide a corner bracket cooperable with edge members whereby a rigid sturdy frame may be provided for a variety of purposes, such as shelter, enclosure or the like.

Another object of this invention is to provide a corner bracket and companion edge members whereby a knockdown shipping crate can be assembled and even fabricated in a short time.

Another object of this invention is to provide a corner bracket and companion edge members in which a hanger can be incorporated for purposes of suspending the panel or door made by the aid of such elements.

This invention possesses many other advantages, and has other objects which may be made more clearly apparent from a consideration of several embodiments of the inevntion. For this purpose, there are shown a few forms in the drawings accompanying and forming part of the present specification, and which drawings are to scale. These forms will be described now in detail, illustrating the general principles of the invention; but it is to be understood that this detailed description is not to be taken in a limiting sense, since the scope of the invention is best defined by the appended claims.

BRIEF DESCRIPTION OF THE DRAWINGS

FIG. 1 is a fragmentary elevational view of a wardrobe door incorporating the present invention.

FIG. 2 is an enlarged fragmentary view illustrating the corner structure of the door shown in FIG. 1, a portion of the suspension rail being broken away and shown in section.

FIGS. 3, 4 and 5 are sectional views taken along planes corresponding to lines 3—3, 4—4 and 5—5 of FIG. 2.

FIG. 6 is a pictorial view of a panel incorporating the present inevntion.

FIG. 7 is a pictorial view of a crate or box incorporating the present invention.

FIG. 8 is an enlarged sectional view taken along a plane corresponding to line 8—8 of FIG. 7.

FIG. 9 is a sectional view similar to FIG. 8 illustrating an alternate edge frame member section to faciiltate interior placement of the corner brackets.

FIG. 10 is a fragmentary elevational view similar to FIG. 2 but illustrating a modified bracket structure.

FIG. 11 is a sectional view taken along a plane corresponding to line 11—11 of FIG. 10.

DETAILED DESCRIPTION

In FIG. 1 there is illustrated the upper section of the inside of a wardrobe door Q, together with a suspension rail R therefor. The wardrobe door Q, which represents a typical structure made in accordance with the present invention, includes a plywood panel P, four corner bracket assemblies S (two of which are illustrated), four edge frame members (three of which, A, B and T, are illustrated), and two suspension assemblies U.

The edge frame members are, in this instance, cut from the same extruded stock material. A description of one frame member will suffice as a description of the other; like parts carry like reference characters. The frame member A, for example (FIG. 4), provides a channel N for reception of the edge of a plywood or similar panel P, the channel N being formed by a bottom wall 10 and an outside wall 12 and an inside wall 14. The edge frame members A and B for example, are held rigidly together by the aid of one of the corner bracket assemblies S. The corner bracket assembly S includes a corner bracket plate E, the right angle flanged sides of which respectively fit the frame members A and B. For this purpose, the frame members are specially formed. The member A, by way of illustration (FIG. 4), has a leg 16 that projects at right angles to the inside channel wall 14 in this instance as an extension of the bottom wall 10 of the channel N. The end of the leg 16 terminates in bead 18 enlarged on that side of the leg 16 facing the inside channel wall 14. The side C of the bracket plate fits against the inside surface of the leg 16, with the free end of the side C cornered against the inside channel flange 14. The side C is formed as a flange extending at right angles from a central portion 20 (see also, FIG. 2) of the bracket plate E. The side C has an arcuate recess 24 (FIG. 4) that conforms to the bead 18. Accordingly, when the bracket plate E is in position, the frame member A is interlocked whereby the bracket plate E is prevented from moving away from the inside channel wall 14.

As shown in FIG. 2, the bracket plate has a side D that similarly fits the frame member B. The sides C and D extend in different planes perpendicular to each other and to the plane of the door. The planes of the sides C and D thus extend at a dihedral angle with respect to each other, with the apex of the dihedral angle located at the corner of the bracket plate E. The bracket plate E has its corner relieved, as at 25. In this instance, both frame members A and B terminate short of the relieved corner. The edge frame members A and B are rigidly secured together by being respectively clamped to the bracket plate E. For this purpose, the frame members A and B are pulled toward the sides C and D to produce a firm frictional engagement therebetween. To this end, a clamp plate F is provided. The clamp plate F underlies the bracket plate E. Along both of its two right angle sides, the clamp plate F has hook flanges G (FIG. 4) and H (FIG. 5) that respectively engage hook flanges J (FIGS. 4 and 5) formed at the ends of the inside channel walls 14 of the frame members A and B respectively.

By exerting force on the hook flange J of the frame member A (FIG. 2) that has a downward component, the leg 16 is clamped to the side C of the bracket plate E. Similarly, by exerting a force on the hook flange J of the frame member B that has a component to the right, the leg 16 is clamped to the side D. The clamping plate F is urged diagonally of the bracket plate E in the direction of the arrow 26, thus to provide the requisite force components 28 and 30 for clamping both frame members A and B.

In order to move the clamping plate, a draw screw assembly L is provided. The assembly L includes a threaded sleeve 32, a reaction collar 34, and a draw screw 36. The draw screw 36 has a shank 38 that passes with clearance through the reaction collar 34. The collar 34 is attached along the diagonal edge of the bracket plate E, with the axis of its opening extending diagonally toward the corner of the bracket plate E and substantially at the level of the end of the hook flange J, by virtue of an offset of the central portion 20 of the bracket plate E. A slot 42 extending inwardly from the reaction collar provides clearance for the shank 38 and also for the threaded sleeve 32 (FIG. 4). The sleeve 32 is attached to the plate F at a slot 44 that extends inwardly from the diagonal edge 48 (FIG. 2) of the clamping plate F. The sleeve 32 nests in the slot 42 of the bracket plate E just behind the reaction collar 34, while the reaction collar 34 is accommodated in an enlarged outer part 50 of the clamping plate slot 44.

By rotating the draw screw 36 with the parts in proper position, the head 52 of the screw ultimately engages the reaction collar; continued rotation of the draw screw causes the clamping plate to be urged in the direction of the arrow 26, and the clamping pressure is equally distributed between the frame members A and B. The draw screw 36 in this instance is provided with a suitable socket or cross slot for cooperation with a suitable hand tool.

The flanged sides C and D of the bracket plate E and the hook flanges G and H of the clamping plate form, in effect, a right angle expansible block that wedges between opposed relatively rigid parts of the frame members.

As shown in FIGS. 4 and 5, the clamping plate F, the bracket plate E, and the draw screw assembly L are located on one side of the plane of the inside channel wall 14. Accordingly, these components may, if desired, all be concealed by a panel P fitted in the channels N of the frame members.

For purposes of assembly, the edge frame members A, B, T, etc. are cut to length and their channels fitted to the edges of the panel P. The brackets S are then installed one at a time. Thus, the clamping plate F is first positioned by moving it from a position in which the hook flanges are offset to a position in which the hook flanges interlock. This is accomplished by movement of the clamping plate in the direction of the arrow 26. The bracket plate E is then positioned by moving its sides C and D against the legs 16, while allowing the reaction collar 34 to drop behind the sleeve 32. The screw 36 is then installed and tightened.

In the event that the panel requires intermediate support, a brace V (FIG. 6) can be installed. The brace may be made of material similar to the edge frame members, except for the deletion of the walls 10 and 12. Corner brackets W then can be installed. In this instance, the edge frame members pass beyond the corner brackets W without interference with the brace V. As many braces may be provided as necessary between parallel frame or brace members. Optionally, two braces may be provided in back-to-back relationship to fit edges of panel sections terminating at the braces, in which cases the braces will be the same as the edge frame members but four corner brackets will be provided. Alternately, there may be provided a brace member having back-to-back channels with a single locking leg 16.

The structure shown in FIGS. 1 and 5 is intended to serve as one of two wardrobe doors to be suspended from a rail R. The rail R may be installed on the inside of an opening to a wardrobe space. The rail R provides two upwardly opening side by side channels for independent movement of two wardrobe doors. The hanger assembly U includes a hanger bar 60 having a cross sectional configuration (FIG. 5) designed to be slidingly received along the inside of the bracket plate. The bar 60 has a longer leg 62 fitted along the side D, a central connecting portion 64 fitted along the inwardly adjoining portion 66 of the bracket plate, and a shorter leg 68 fitted along an offset web 70 forming the boundary of the central portion 20 of the bracket plate E. The shorter leg 68 allows clearance for the hook flanges. The bar 60 is inserted through the open corner of the bracket plate as shown in FIG. 2.

The upper end of the bar 60 carries a roller 72 (FIG. 3) that rests in one of the channels of the rail R. The lower end of the bar 60 carries an adjusting screw 74 by the aid of which the door is suspended from the bar 60. The threaded end of the screw 74 engages a threaded aperture 76 in a lower end wall 78 of the bar 60, while the head of the screw engages about the edges of an aperture 80 in a transverse wall 82 in the bracket plate E. The downward thrust due to the weight of the frame is transmitted through the screw 74 to the bar 60, the roller 72 and the rail R. In order to stabilize the suspension bar 60, a screw 84 is provided to clamp the bar to the connecting portion 66 of the bracket plate E. A slot 86 allows for vertical adjustment of the bar.

In FIG. 7 there is illustrated a box or crate made of a plurality of like edge frame members 90 arrayed as a rectangular parallepiped. Each edge frame member 90 as shown in FIG. 8 is, in effect, a composite of two frame members 92 and 94, each identical to those previously described. The frame member 92 has its channel web 10 and extended leg 16 placed against the outside wall 12 of the companion member 94. The parts are secured together, in any conventional manner. In practice, the members may be made together as a single extrusion.

The placement of the components 92 and 94 is such that the channels open in right angle relationship to each other to receive panles 96 and 98. Corner bracket assemblies S hold the corners of the crate together in the same manner as previously described.

In the form illustrated in FIG. 9, the corner bracket assemblies S are located on the inside of the structure. An edge frame member 100 is, in effect, a composite of two frame members arrayed in right angle relationship. One of the components includes the channel bottom wall 10a and leg 16a, and the other component includes the channel bottom wall 10b and leg 16b. In this instance, the legs 16a, 16b meet at a common bead 102. The outer walls 12a and 12b of the channels of the components are extended as at 104 and 106 until they meet at a common corner 108. The size of the components shown in FIGS. 7, 8, and 9 can be varied according to the size of the resulting structure. By making the parts of adequate size and metal gauge, a rigid framework for a building structure can be provided.

In FIGS. 10 and 11 an alternate corner bracket assembly is illustrated. In this instance, the corner bracket plate 120 and the clamping plate 122 are diagonally moved by the aid of a toggle mechanism M instead of the draw screw assembly L. In all other respects, the structure of FIGS. 10 and 11 is the same as that previously described.

The toggle mechanism includes a toggle lever 124 pivotally mounted near the corner of the bracket plate 120 by a pair of spaced brackets 126 and a pin 128. The axis of movement of the lever is generally parallel to the plane of the supported panel and located at 45° angles with respect to both sides of the bracket plate. The elever 124 cooperates with a toggle link 132 pivotally mounted near the diagonal edge of the clamping plate 122 by a pair of spaced brackets 134 and a pin 136. The brackets 134 project through an access slot 138 in the bracket plate 120. The pin 136 substantially parallels the pin 128 when the parts are assembled. The other end of the toggle link is pivotally connected to the toggle lever by the aid of a pin 140.

In the position illustrated in FIG. 11, the toggle link pin 140 lies below a center line joining the pins 128 and 136. The stress in the parts tends to move the pins 128 and 136 toward each other, and thus to crank the lever 124 downwardly. This is limited by engagement of the lever with the top surfaces of the brackets 134, in which position, the pin 140 is close to the center line. By lifting the lever 124, the pin 140 is carried above the center line and the pins 128 and 136 are caused to move toward each other as the jaw elements of the parts release. The reverse movement of the lever 124 causes the jaw elements of the parts firmly to engage each other by urging the pins 128 and 136 apart.

What is claimed is:

1. In combination: a pair of separate frame members of substantially uniform cross section extending at an angle with respect to each other and defining a corner and parallel bounding planes; each of said frame members having:
    (a) a first channel wall at one of said bounding planes,
    (b) a second channel wall located intermediate said bounding planes,
    (c) a bottom channel wall extending between said first and second walls,
    (d) a leg projecting laterally of said second channel wall and terminating at the other of said bounding planes, and
    (e) a hook flange extending laterally from said second channel wall toward said other of said bounding planes and having an opening opposed to said leg;
said channel walls defining an opening toward the inside of said corner for receiving the edges of a panel; a corner bracket member having flanged sides, each of said flanged sides extending along the inside of the legs of the respective frame members; means engaging said hook flanges for forcing said frame member legs into rigid engagement with said bracket member sides by movement in a direction extending diagonally through the corner and parallel to said bounding planes whereby said frame members are rigidly connected together as a structural unit; said frame member legs together encompassing said corner bracket member and said means engaging said hook flanges.

2. The combination as set forth in claim 1 in which the distal edge of said leg of each of said members terminates in a bead; said flanged sides of said bracket member having a configuration interfitted by said bead to prevent slippage in a direction perpendicular to said bounding planes.

3. The combination as set forth in claim 1 in which the corner region of said bracket member is open and said frame members terminate substantially at said open corner; and a hanger bar extending through the open corner with one side extending along and secured to the inside of said bracket member flanged side.

4. The combination as set forth in claim 3 together with an adjusting screw threadedly connected to the lower end of said bar and having a bead upon which said bracket member is rested.

5. A corner bracket assembly comprising a pair of separate frame members extending at an angle with respect to each other and defining a corner, said frame members each having oppositely facing walls defining locking channels, a clamping plate located at said corner and having means engaging one of said walls of each of said frame members, a bracket plate overlying said clamping plate and having means engaging the other of said walls of each of said frame members, and means causing relative shifting movement between said plates in a direction parallel thereto and diagonally through said corner for causing said means engaging said oppositely facing walls of each of said locking channels to apply a force against its respective wall in a direction opposite to the force applied to the respective opposite wall whereby said bracket assembly is clamped together as a structural unit.

6. The bracket assembly of claim 5 wherein said frame members provide channels opening toward the inside of said corner for receiving the edges of a panel, and said panel receiving channels being disposed adjacent said locking channels whereby a panel supported therein conceals said clamping plate and said bracket plate from view on one side of said assembly.

7. The bracket assembly of claim 5 wherein said engaging means are flanges disposed generally perpendicularly to the respective clamping and bracket plates.

8. The bracket assembly of claim 7 wherein one of said walls of each of said locking channels has a bead overlying the locking channel and interfitting said bracket plate flange for confining said bracket plate in said locking channel.

9. The bracket assembly of claim 7 wherein one of said walls of each of said locking channels is inclined inwardly and interfits said clamping plate flange for confining said clamping plate in said locking channel.

References Cited

UNITED STATES PATENTS

| 1,459,094 | 6/1923 | French | 269—41 |
| 2,947,391 | 8/1960 | Wayne | 287—189.36 |
| 3,058,173 | 10/1962 | Brydolf | 287—189.36 |

FOREIGN PATENTS

| 276,097 | 10/1913 | Germany. |
| 1,460,453 | 10/1966 | France. |

HENRY C. SUTHERLAND, Primary Examiner

J. L. RIDGILL, Jr., Assistant Examiner

U.S. Cl. X.R.

52—476, 584; 287—189.36